United States Patent
Wilborn et al.

(10) Patent No.: US 6,529,850 B2
(45) Date of Patent: Mar. 4, 2003

(54) APPARATUS AND METHOD OF VELOCITY ESTIMATION

(76) Inventors: Thomas Brian Wilborn, 10765 Escobar Dr., San Diego, CA (US) 92124; Shimman Patel, 9406 Galvin Ave., San Diego, CA (US) 92126; Gilbert C. Sih, 7804 Pipit Pl., San Diego, CA (US) 92129; Farrokh Abrishamkar, 5218 Sandhill Ter., San Diego, CA (US) 92130

(*) Notice: Subject to any disclaimer, the term of this patent is extended or adjusted under 35 U.S.C. 154(b) by 0 days.

(21) Appl. No.: 09/776,128

(22) Filed: Feb. 1, 2001

(65) Prior Publication Data

US 2002/0138229 A1 Sep. 26, 2002

(51) Int. Cl.$^7$ .............................. G06F 15/00; H04B 1/10
(52) U.S. Cl. ........................ 702/142; 702/127; 375/346
(58) Field of Search ................................ 702/127, 142; 375/130, 148, 341, 346, 349; 370/335, 342, 345

(56) References Cited

U.S. PATENT DOCUMENTS

| | | | | |
|---|---|---|---|---|
| 5,748,677 A | * | 5/1998 | Kumar | 375/355 |
| 5,825,807 A | * | 10/1998 | Kumar | 375/130 |
| 6,246,885 B1 | * | 6/2001 | Black et al. | 455/553 |
| 6,272,168 B1 | * | 8/2001 | Lomp et al. | 375/222 |
| 6,377,607 B1 | * | 4/2002 | Ling et al. | 375/130 |

FOREIGN PATENT DOCUMENTS

| | | |
|---|---|---|
| EP | 0808031 | 4/1997 |
| EP | 0903951 | 9/1998 |
| WO | 9858513 | 6/1998 |

OTHER PUBLICATIONS

Sakamoto, M. et al. (2000) Adaptive channel estimation with velocity estimator for W–CDMA receiver. IEEE 2024–2028.

* cited by examiner

*Primary Examiner*—Bryan Bui
(74) *Attorney, Agent, or Firm*—Philip Wadsworth; Charles Brown; Kevin Cheatham

(57) ABSTRACT

A velocity estimate is determined from a received signal by counting the number of times a signal in one multipath crosses a predetermined threshold in a given amount of time. A signal is received and a single multipath is extracted from the received signal. Instantaneous envelope values of the extracted multipath are calculated. A plurality of the instantaneous envelope values are used to calculate a running RMS value. A level crossing threshold is determined using the running RMS value. The number of times the instantaneous envelope value crosses the level crossing threshold is counted. The number of level crossings is mapped to a velocity estimate.

18 Claims, 9 Drawing Sheets

APPARATUS AND METHOD OF VELOCITY ESTIMATION

BACKGROUND OF THE INVENTION

I. Field of the Invention

The present invention relates to wireless communications. More particularly, the present invention relates to a novel and improved apparatus and method of velocity estimation using AGC information.

II. Description of the Related Art

Wireless devices utilize radio waves to provide long distance communications without the physical constraints of a wire-based system. Information is provided to devices using radio waves transmitted over predetermined frequency bands. Allocation of available frequency spectrum is regulated to enable numerous users access to communications without undue interference.

A remote receiver tuned to a carrier frequency is required to receive and demodulate signals transmitted from a corresponding transmitter at the same carrier frequency. The remote receiver recovers the baseband signal from the modulated carrier. The baseband signal may be directly presented to a user or may be further processed prior to being presented to the user.

Portable wireless communication devices incorporating both a transmitter and receiver are used to provide two-way communications. Examples of portable wireless communication devices, commonly termed mobile units, are wireless telephones. Wireless phones may form a part of a wireless communication system such as those defined in Telecommunications Industry Association (TIA)/Electronics Industries Association (EIA) IS-95-B, MOBILE STATION-BASE STATION COMPATIBILITY STANDARD FOR DUAL-MODE SPREAD SPECTRUM SYSTEMS and American National Standards Institute (ANSI) J-STD-008, PERSONAL STATION-BASE STATION COMPATIBILITY REQUIREMENTS FOR 1.8 TO 2.0 GHZ CODE DIVISION MULTIPLE ACCESS (CDMA) PERSONAL COMMUNICATIONS SYSTEMS. Wireless phones used in the two aforementioned systems must conform, respectively, to the standards TIA/EIA IS-98-B, RECOMMENDED MINIMUM PERFORMANCE STANDARDS FOR DUAL-MODE SPREAD SPECTRUM CELLULAR MOBILE STATIONS and ANSI J-STD-018, RECOMMENDED MINIMUM PERFORMANCE REQUIREMENTS FOR 1.8 TO 2.0 GHZ CODE DIVISION MULTIPLE ACCESS (CDMA) PERSONAL STATIONS.

A radio receiver operates in a relatively hostile environment. A radio signal propagating from a transmitter to a corresponding receiver is subjected to scattering and reflections by objects and structures surrounding the transmitter and receiver. Structures, such a buildings, and surrounding terrain, such as walls and hillsides, contribute to the scattering and reflection of the transmitted signal. The scattering and reflection of the transmit signal results in multiple signal paths from the transmitter to the receiver. The objects that contribute to the multiple signal paths are centered about the receiver in a radius that is proportional to the receive signal wavelength. The contributors to the multiple signal paths change as the receiver moves.

The signal incident at the receiver antenna is the sum of all the multipath signals that are the result of the scattering and reflections of the signal from the transmitter to the receiver. The composite received signal can be modeled as having two components.

The first component is termed shadowing, slow fading, lognormal fading, or long-term fading. Slow fading results from the terrain contour between the transmitter and the receiver or as a result of the receiver passing through a tunnel, under a bridge, or behind a building. The received power measured at any particular location varies in time due to the effects of slow fading. The measured receive power due to the slow fading component is lognormally distributed.

The second signal component is termed fast fading, multipath fading, short-term fading, or Rayleigh fading. Fast fading results from the reflection and scattering of the transmitted signal by obstacles in the transmit path such as trees, buildings, vehicles, and other structures. Fast fading results in a fade of the entire receive bandwidth where signals arriving at the receiver combine destructively.

The signal incident at the receiver is composed of the fast fading signal superimposed on the slow fading signal. As a result, a moving radio receiver may experience tremendous variations in received signal strength. Additionally, a moving receiver experiences a frequency shift in the received signal. One contributor to a frequency shift is the doppler shift that causes a receive signal frequency offset proportional to the speed of the receiver relative to the transmitter.

A moving radio receiver, such as a mobile phone operating in the IS-95 or J-STD-008 communication systems, experiences signal fades and frequency doppler shifts as a routine part of its operating environment. A mobile receiver incorporates various techniques to compensate for the amplitude and frequency variations of the incoming signal.

However, many of the mobile receiver demodulation algorithms can be improved if the mobile receiver has knowledge of its velocity. Moreover, knowledge of the mobile receiver's velocity can be used in conjunction with position determination algorithms. Additionally, the velocity of the mobile receiver can be provided as telemetry data to be transmitted to a remote site or as data available to the user. What is needed is the ability to determine the velocity of the mobile receiver using the signals that are incident on the receiver. The measurement of the mobile receiver's velocity needs to be performed without burdening the communication system.

SUMMARY OF THE INVENTION

The present embodiments disclose a novel and improved velocity estimator having a signal processor that extracts one multipath from a received signal, a signal scaler and multiplier for scaling the received signal by a scale factor that is the inverse of any AGC gain, an instantaneous envelope calculator, a running RMS calculator, a level crossing counter to calculate the number of times the instantaneous envelope values cross a level crossing threshold, and a look up table that maps a level crossing number to a velocity estimate. The velocity estimator may also incorporate a FIFO for storing a predetermined number of instantaneous envelope values.

When the velocity estimator is implemented within a CDMA wireless communication device, the received signal is a composite CDMA signal and a single multipath can be obtained by despreading and accumulating a pilot signal over a predetermined number of chips.

The level crossing counter may incorporate hysteresis into the level crossing counting by incorporating a high level threshold and a low level threshold. The high level threshold may be generated as a first predetermined level, M, dB above one half the running RMS value. The low level threshold may be generated as a second predetermined value, N, dB below one half the running RMS value. The values M and N may be three in a particular embodiment.

The velocity estimator may use a normalizing multiplier to generate a normalized value by multiplying the instantaneous envelope value by a normalizing factor. In one embodiment, the normalizing factor may be 2/(running RMS value). When the normalizing multiplier is used, the level crossing counter uses predetermined level crossing thresholds.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
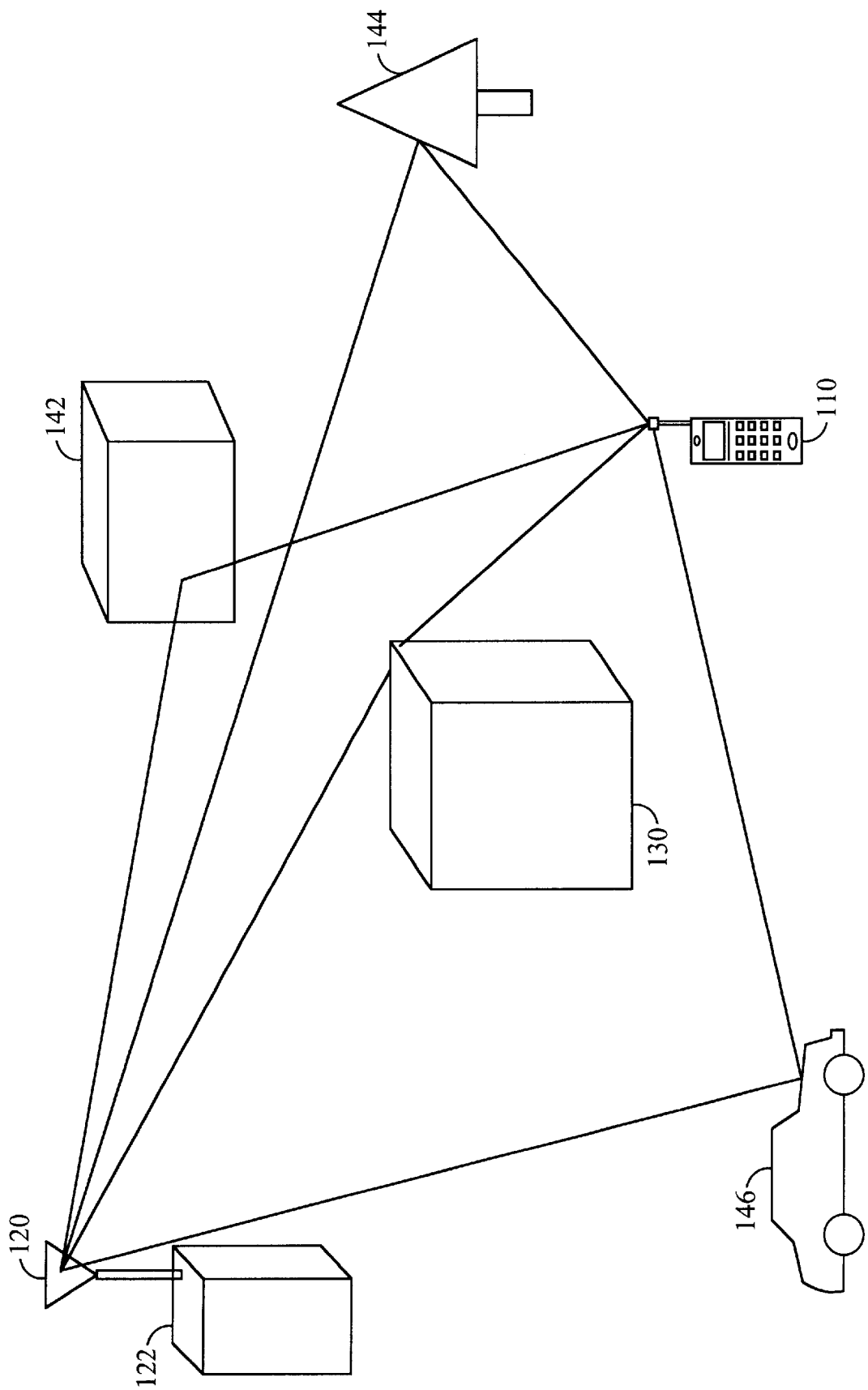
FIG. 1 is a diagram of a wireless communication system.

FIG. 1 shows a block diagram of a wireless communication system where the mobile receiver implements velocity estimation. A wireless telephone system is provided only as an exemplary embodiment. Mobile receiver velocity estimation as disclosed herein is not limited to implementation in a wireless telephone system or even a wireless communication system. It will be apparent to one skilled in the art of receiver design that velocity estimation as disclosed herein may be implemented in mobile radio receivers.

A mobile phone 110 operating in a wireless communication system, such as an IS-95 or J-STD-008 system, uses radio waves to communicate with a base station 120. The base station 120 is identified by an antenna, although in reality the base station hardware would not be immediately located with the antenna. The base station 120 antenna may be located on a building 122 or may be located on an antenna tower. Although only one base station 120 is shown, the mobile phone 110 may simultaneously communicate with more than one base station 120. Transmissions from the base station 120 to the mobile phone 110 ideally traverse a single path, but in reality traverse multiple paths.

Terrain or a structure 130 may obstruct the signal path from the base station 120 to the mobile phone 110. The structure 130 that shadows the mobile phone 110 contributes to slow fade variations of the received signal power. Multiple signal paths from the base station 120 to the mobile station 110 occur because of reflections and scattering of the transmitted signal. Alternate signal paths may occur due to reflections off of structures 142, trees 144, and vehicles 146 that are sufficiently near the mobile phone 110. The objects that contribute to the multiple signal paths are centered about the mobile phone 110 in a radius that is proportional to the receive signal wavelength. The local sources of reflected transmit signals result in a received signal that is subject to fast fading. A mobile phone 110 that is moving is subjected to a fast fading signal due to the constant change in multiple signal paths. As will be explained below, the mobile phone 110 incorporates velocity estimation based upon the fast fade signal. The estimate of the mobile phone 110 velocity can be used to generate correction factors used in demodulation of the received signal or can be retransmitted or converted to a display value for the user.

Figure 2:
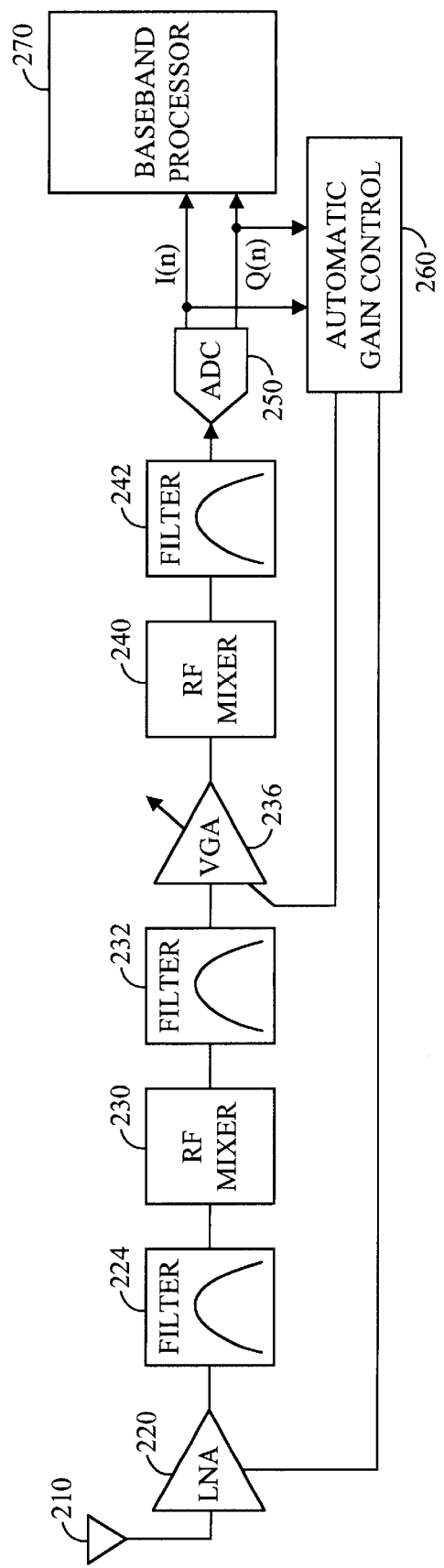
FIG. 2 is a block diagram of a wireless receiver.

FIG. 2 is a block diagram of a conventional heterodyne receiver 200. An antenna 210 is used to interface the wireless receiver 200 to incoming radio waves. Where the receiver 200 is implemented along with a corresponding transmitter in a wireless phone, the antenna 210 is also shared with the transmitter. In a wireless phone a duplexer is used to couple the signals from the antenna 210 to the remainder of the receiver and from the transmitter to the antenna 210. The duplexer and corresponding transmitter are not shown in FIG. 2 for the purposes of clarity.

The output of the antenna 210 is coupled to a Low Noise Amplifier (LNA). The LNA 220 following the antenna 210 is used to amplify the receive signal. The LNA 220 is also the major contributor to the receiver's noise figure. The noise figure of the LNA 220 adds directly to the noise figure of the receiver while the noise figure of subsequent stages is reduced in proportion to the LNA 220 gain. Thus, the LNA 220 is chosen to provide a minimal noise figure in the receive band while amplifying the receive signal with sufficient gain to minimize noise figure contributions from subsequent stages.

The signal amplified in the LNA 220 is coupled to an RF filter 224. The RF filter 224 is used to provide rejection to signals outside of the receive band. The RF filter 224 is used after the LNA 220 stage in order to reduce the filter's contribution to the total receiver noise figure. The output of the RF filter 224 is coupled to an input of a RF mixer 230.

The RF mixer 230 mixes the amplified receive signal with a locally generated frequency signal to downconvert the signal to an Intermediate Frequency (IF). The IF output of the RF mixer 230 is coupled to an IF filter 232. The IF filter 232 is used to pass only the IF resulting from a single receive channel. The IF filter 232 is used to reject signals outside of the IF bandwidth, particularly adjacent channel signals and the undesired mixer products. The IF filter 232 has a much narrower frequency response than does the RF filter 224. The IF filter 232 can have a much narrower bandwidth since the RF mixer 230 downconverts the desired RF channel to the same IF regardless of the frequency of the RF channel. In contrast, the RF filter 224 must pass the entire receive band since any channel in the receive band can be allocated to the communication link. The output of the IF filter 232 is coupled to a Variable Gain Amplifier (VGA) 236 that is used to increase the signal level.

The VGA 236 is used as part of an Automatic Gain Control (AGC) loop used to maintain a constant amplitude in the receive signal for the subsequent stages. The gain of the VGA 236 is varied using a control loop that detects the amplitude of the amplifier's output. The output from the VGA 236 is coupled to an input of an IF mixer 240.

The IF mixer 240 downconverts the IF signal to a baseband signal. The Local Oscillator (LO) used in conjunction with the IF mixer 240 is separate and distinct from the first LO. The baseband output of the IF mixer 240 is coupled to a baseband filter 242. The baseband filter 242 is used to lowpass the downconverted baseband signal to remove all undesired mixer products and to provide further rejection of any adjacent channel signals that were not previously rejected by the IF filter 232. The output of the baseband filter 242 is coupled to an Analog to Digital Converter (ADC) 250 where the analog baseband signal is converted to digital samples. Where the receiver 200 is a CDMA receiver, such as one used in the communication systems defined in IS-95 or J-STD-008, the baseband signal is composed of an in phase component and a quadrature component. The in phase and quadrature baseband components can be separated by downconverting the IF signal in two separate mixers, where the LO signals to each of the IF mixers are in quadrature. The ADC 250 samples both the in phase and quadrature baseband signals to produce, respectively, in phase and quadrature digital samples. The output of the ADC 250 is coupled to a baseband processor 270.

The baseband processor 270 stage represents all subsequent processing that is performed on the baseband signal. Examples of subsequent processing include, but are not limited to, despreading, deinterleaving, error correction, filtering, and amplification. As an example, the baseband processor in a CDMA phone incorporates multiple demodulator fingers arranged as a rake receiver. The processed information is then routed to the appropriate destination. The processed information may be used within the wireless device as a control signal or may be routed to a user interface such as a display, loudspeaker, or data port.

The output of the ADC 250 is also coupled to an Automatic Gain Control (AGC) 260 stage. The AGC 260 measures the energy of the incoming signal and provides control signals to the LNA 220 and the VGA 236 to scale the received analog signal such that the downconverted baseband signal remains within the predetermined dynamic range of the ADC 250. Since the LNA 220 is typically not a variable gain amplifier, the control signals coupled to the LNA 220 are typically used to control amplifier DC bias.

The dynamic range of the received analog signal can be as high as 80dB, which would normally require an ADC bitwidth of around 13–14 bits to quantize it without incurring saturation or truncation loss. However, the IQ sample bitwidths on commercial Application Specific Integrated Circuits (ASICs) are typically limited to 4–6 bits, due to a desire to minimize external pins, data path hardware, and power consumption. The AGC loop is used to capture the large dynamic range with a small ADC bitwidth. The AGC measures the energy of the incoming signal, and controls the LNA and VGA to scale the analog signal so that it stays within the dynamic range supported by the ADC bitwidth.

Figure 3:
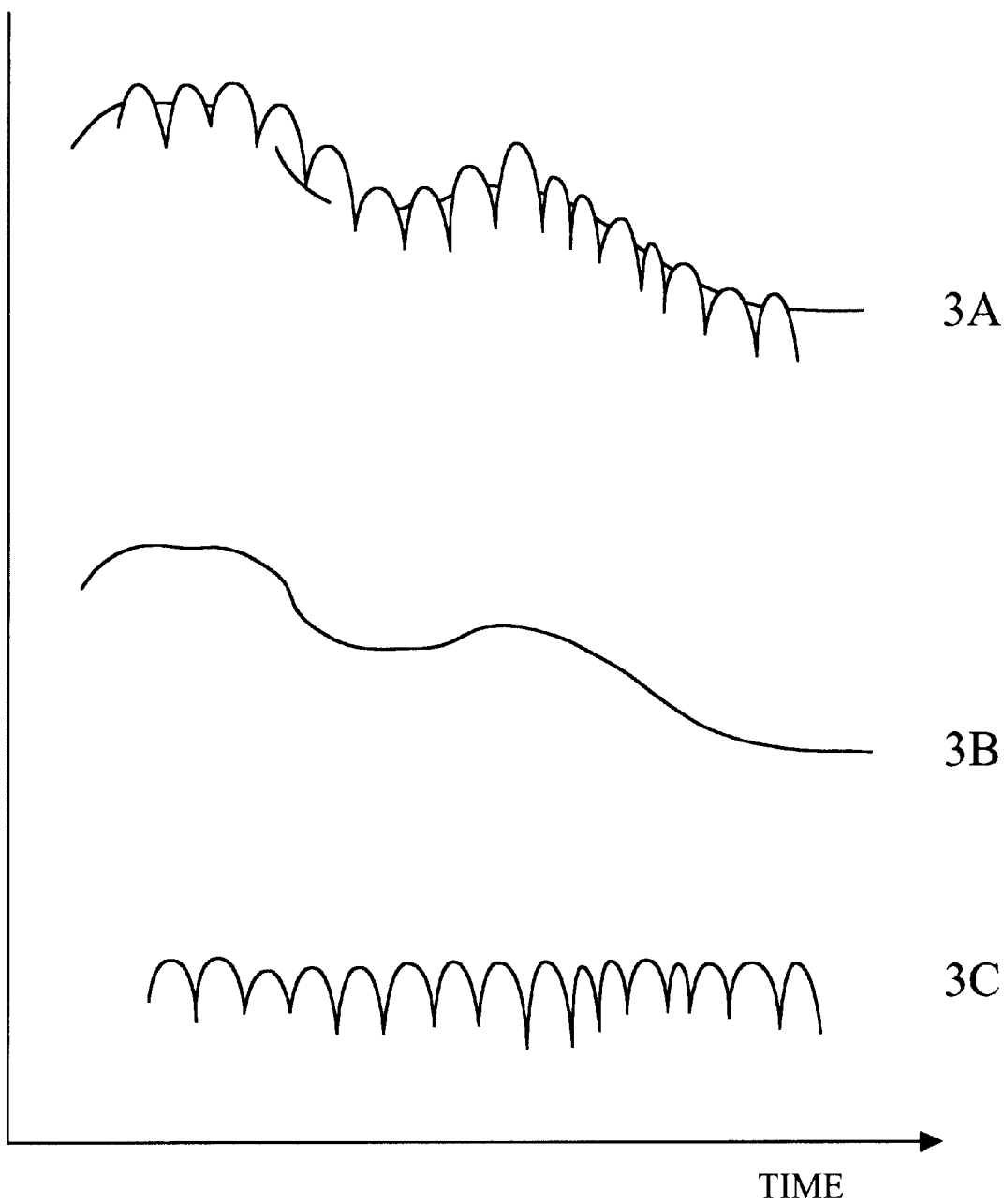
FIG. 3 is a diagram of a received signal.

As discussed above, the physical terrain and structure surrounding the mobile phone create multiple signal paths from the transmitter to the mobile phone receiver. The composite received signal can be modeled as multiple signals having a slow fade component and a fast fade component. An example of one the multipath signals for a moving mobile phone, showing the variation in time of the received signal power due to slow fade and fast fade components, is shown in FIG. 3A. The slow fade component of the composite received signal is shown in FIG. 3B. The fast fade, or Rayleigh fade, component of the composite received signal is shown in FIG. 3C. The AGC loop within the receiver is able to compensate for nearly all of the effects of the slow fade and is able to compensate for a portion of the effects of the Rayleigh fade.

Velocity estimation can be made using measurements of the power in a single multipath over time. The speed of the mobile can be estimated from the number of times this power crosses one half of its RMS power level in a given period of time (this is known as the level crossing rate). Thus, the velocity of the mobile unit can be estimated by the number of times the fast fade results in a crossing of the one half RMS power level threshold. The threshold of one half of the RMS power level is not the only threshold that can be used for velocity estimation. Any other fraction or multiple of the RMS power level can be chosen as the threshold level. However, using one half of the RMS power level as a threshold results in a maximum level crossing rate for a given velocity.

One difficulty in implementing this velocity estimator is in building an accurate meter in the mobile for measuring the power of one multipath. Because the level crossing rate algorithm for velocity estimation requires knowledge of the received power in a single multipath over time, the power in a single multipath must be isolated from the total received power. Even if the power in a single multipath is isolated, a second problem arises due to the effects of the AGC. Because the AGC attempts to keep the receive signal envelope fairly constant, the information needed for the mobile to estimate the receive power is destroyed. Without an accurate measure of received signal power, performing velocity estimation using level crossing will not function correctly.

In order to utilize level crossing rate of the receive power as an estimator of the receiver's velocity, the receiver must isolate a single multipath, correct for the AGC effects on the signal amplitude, and count the number of times the received signal crosses a threshold that is based on the RMS receive power.

In a first embodiment, a CDMA receiver uses the characteristics of the pilot signal to aid in velocity estimation. In CDMA systems, the base station sends a pilot signal that can be used by the mobile receiver as a phase reference for coherent demodulation. Knowledge of the pilot power of one multipath is sufficient for determining the level crossing rate. The value of pilot power in one multipath normalized by its RMS power level is equivalent to the normalized total power received in one multipath. The equivalence of the two ratios assumes the ratio of the pilot energy to the total energy transmitted by the base station (Ecp/Ior) is constant. The constant ratio of the pilot signal to the total energy transmitted is true for CDMA systems. In other words, because fading affects all Walsh-coded channels identically, the normalized power information is available using the power of one channel (the pilot). The power in one multipath is separated from the total received power by coherently integrating the despread pilot over a sufficient amount of time. Coherent integration separates the pilot power from the power in the orthogonal data channels. A CDMA receiver may assign one finger of the rake receiver to an identified multipath. However, the despread, integrated pilot alone is not an accurate estimate of its corresponding path's power at the antenna because the signal has been scaled dynamically by the AGC circuit.

Figure 4:
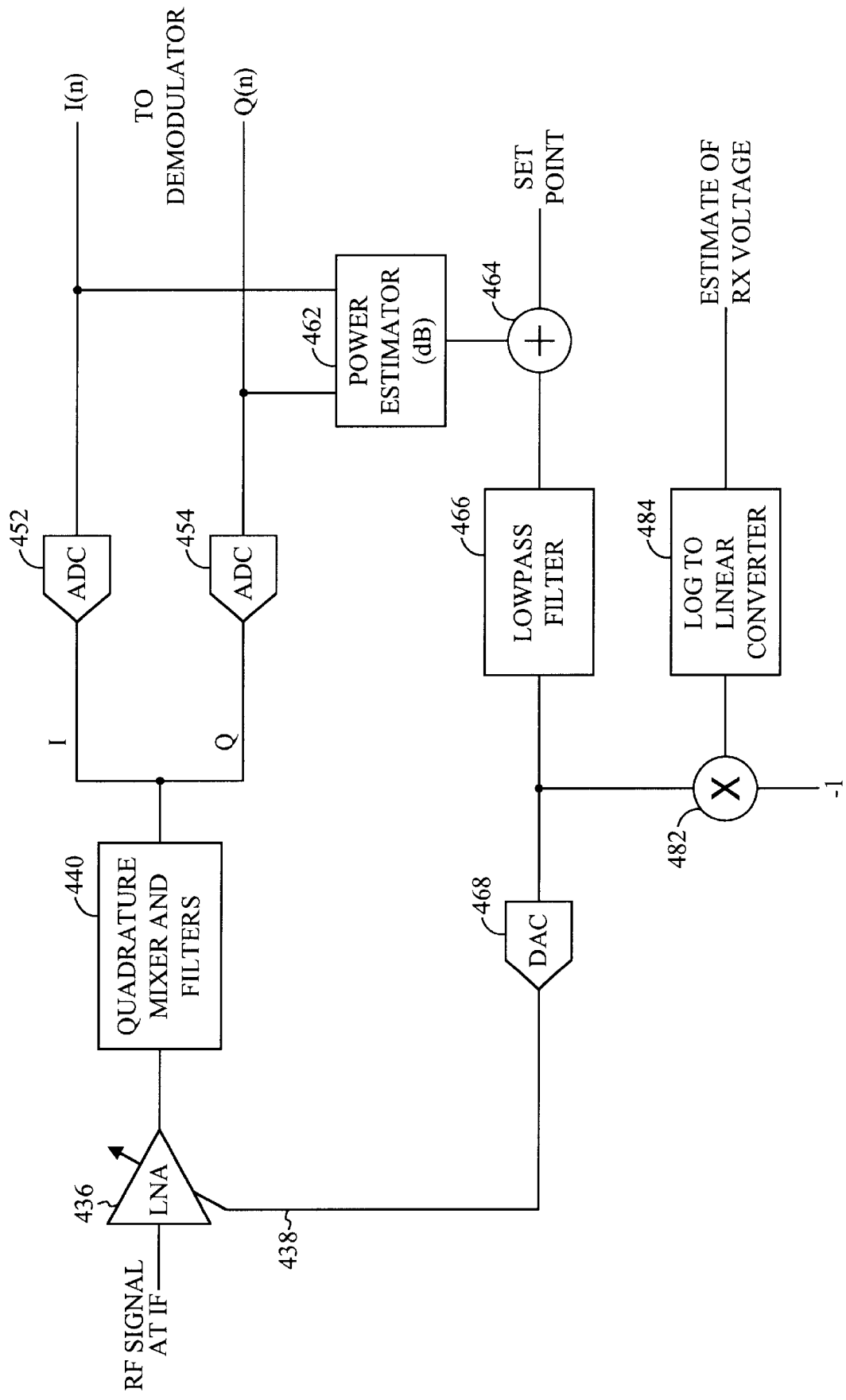
FIG. 4 is a block diagram of receive signal estimation.

The effects of the AGC can be removed by scaling the received signal by the inverse of the AGC gain. FIG. 4 shows a block diagram of an implementation that scales an input signal to remove the effects of an AGC loop. A signal is input to a circuit that utilizes AGC. This is shown in FIG. 4 as the input signal to the VGA 436. When the circuit of FIG. 4 is implemented in a CDMA receiver, the input to the VGA 436 may be the downconverted IF signal. The variable gain loop may include RF stages or may encompass only baseband stages. The distribution of the variable gain is not a limitation of the scaling circuit.

A signal on a control line 438 determines the amplification level of the VGA 436. In a CDMA receiver, the output of the VGA 440 is an IF signal that is coupled to a signal processing stage that performs quadrature mixing and filtering 440. The quadrature baseband output is comprised of in phase and quadrature signal components. The in phase signal is coupled to a first ADC 452 and the quadrature signal is coupled to a second ADC 454. The sampled output signals from the two ADC's, 452 and 454, are coupled to a power estimator 462 that forms a part of the AGC loop. The power estimator 462 makes an estimate of the instantaneous receive power based upon the ADC outputs. The output of the power estimator 462 is subtracted from a predetermined set point using an inverting summer 464. The predetermined set point is chosen to represent a signal power value near the upper bound of the ADC's, 452 and 454. Power estimates that exceed the set point result in the generation of a signal on the control line 438 that reduces the gain of the VGA 436. Power estimates that are below the set point result in the generation of a signal on the control line 438 that increases the gain of the VGA 436.

The output of the inverting summer 464 is coupled to a low pass filter 466. The output of the low pass filter 466 is coupled to a Digital to Analog Converter (DAC) 468 that generates an analog control signal for application to the VGA 436. The DAC 468 is not required when the VGA is able to accept a digital control signal. The VGA 436 varies its gain according to the control signal.

The output of the low pass filter 466 is also coupled to an inverter, here shown as a multiplier 482 having a multiplication factor of −1. The output of the multiplier 482 is coupled to a log to linear converter 484. The log to linear converter 484 is configured with a transfer function that is the inverse of the AGC control signal—signal gain transfer function. The transfer function of the log to linear converter 484 is the inverse of the VGA response where the VGA 436 is the only variable gain element. The log to linear converter 484 must compensate for the variable gain of additional elements when more than one variable gain element is within the control of the AGC circuit. The output of the log to linear converter 484 is an estimate of the receive signal voltage with any effects of the AGC circuit removed.

The signal scaler provides sufficient signal processing to allow an accurate determination of the level crossing rate when the receive Signal to Noise Ratio (SNR) is high. This is because noise components in the receive signal are insignificant in relation to the receive signal power and thus, do not adversely contribute to the determination of the level crossing rate. However, when noise components represent a significant contribution to the total receive power the noise components adversely contribute to the determination of the level crossing rate when a single threshold is used.

As described above, the pilot signal is integrated over a period of time to separate the power in one multipath from the total received power. This coherent integration provides an instantaneous estimate of the pilot signal power. The pilot integration time is determined based on the highest frequency component of the expected fast fade. The frequency component of the fast fade can be estimated using the expected velocity range that the receiver will experience. The pilot integration time must be sufficiently less than the period of the fast fade in order to reliably detect level crossings. Because this amount of time is finite when the channel has fading, the measured pilot power has a certain amount of noise associated with it. The SNR of the integrated pilot's power is directly proportional to $Iorhat_0 \cdot (Ecp/Ior)/(Ioc+Nt)$, where $Iorhat_0$ is the amount of signal power at the mobile in a path 0, (Ecp/Ior) represents the ratio of the pilot energy to the total energy transmitted at the base station, and (Ioc+Nt) represents the total interference due to adjacent base stations and thermal noise. Therefore, where the total receive power is low or where the level of interference and noise are high, the measurement of the pilot's power is noisy. This noise causes the estimate of the pilot's power to cross the threshold value many times, whereas the actual received pilot, as measured in a noise-free system, crosses only once.

In order to decrease the effect of the signal's SNR on the level crossing rate, level hysteresis can be used. Hysteresis is meant to imply the use of a high threshold and a low threshold. A signal's amplitude is not considered to cross the threshold level unless it starts below the lower hysteresis threshold (set N dB lower than threshold level) and then crosses the upper hysteresis threshold (set M dB higher than threshold level), or vice versa. The threshold level that results in a maximum number of level crossings is one half of the RMS signal power. However, the actual threshold used is not a design limitation and can be chosen to be any level relative to the RMS level. In an exemplary implementation, M and N are set to 3. The values of M and N need not be the same and may not be depending on the predetermined threshold level. Therefore, when hysteresis is implemented, small changes in the measurement of the signal's amplitude that are less than (N+M) dB do not get counted in the level crossing rate computation. The level hysteresis algorithm can be expressed by the following pseudocode, where s(n) is the symbol amplitude at time n, $T_H$ is the high hysteresis threshold level, and $T_L$ is the low hysteresis threshold level.

```
if (s(n) < T_L) {
        if (thresholdFlag == 0) {
        levelCrossingCounter++;
        }
        thresholdFlag = 1;
} else if (s(n) > T_H) {
        if (thresholdFlag == 1) {
        levelCrossingCounter++;
        }
        thresholdFlag = 0;
}
```

Figure 5:
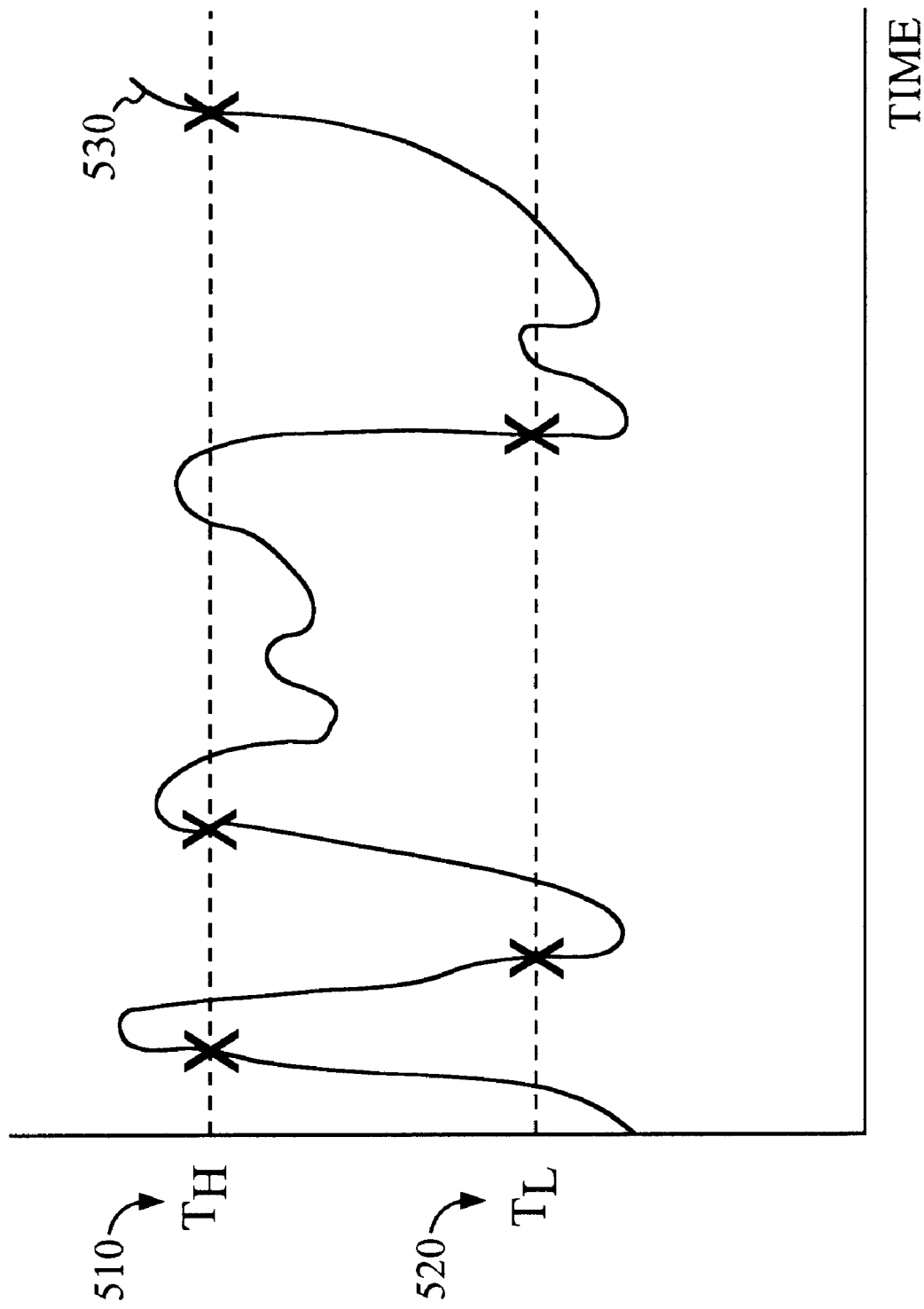
FIG. 5 is a diagram of level hysteresis.

FIG. 5 shows an estimate of the signal in one multipath 530 over time in a noisy environment. Ordinarily, the fast fade would result in a signal such as that shown in FIG. 3C. However, contributions from the noise component result in a noisy estimate of the multipath signal. The high hysteresis threshold is denoted $T_H$ 510 and the lower hysteresis threshold is denoted $T_L$ 520. The predetermined threshold level occurs at a power level in between the high and low hysteresis thresholds and is not shown in FIG. 5. The operation of the pseudocode provided above results in a level crossing count only at those points denoted by the X.

Figure 6:
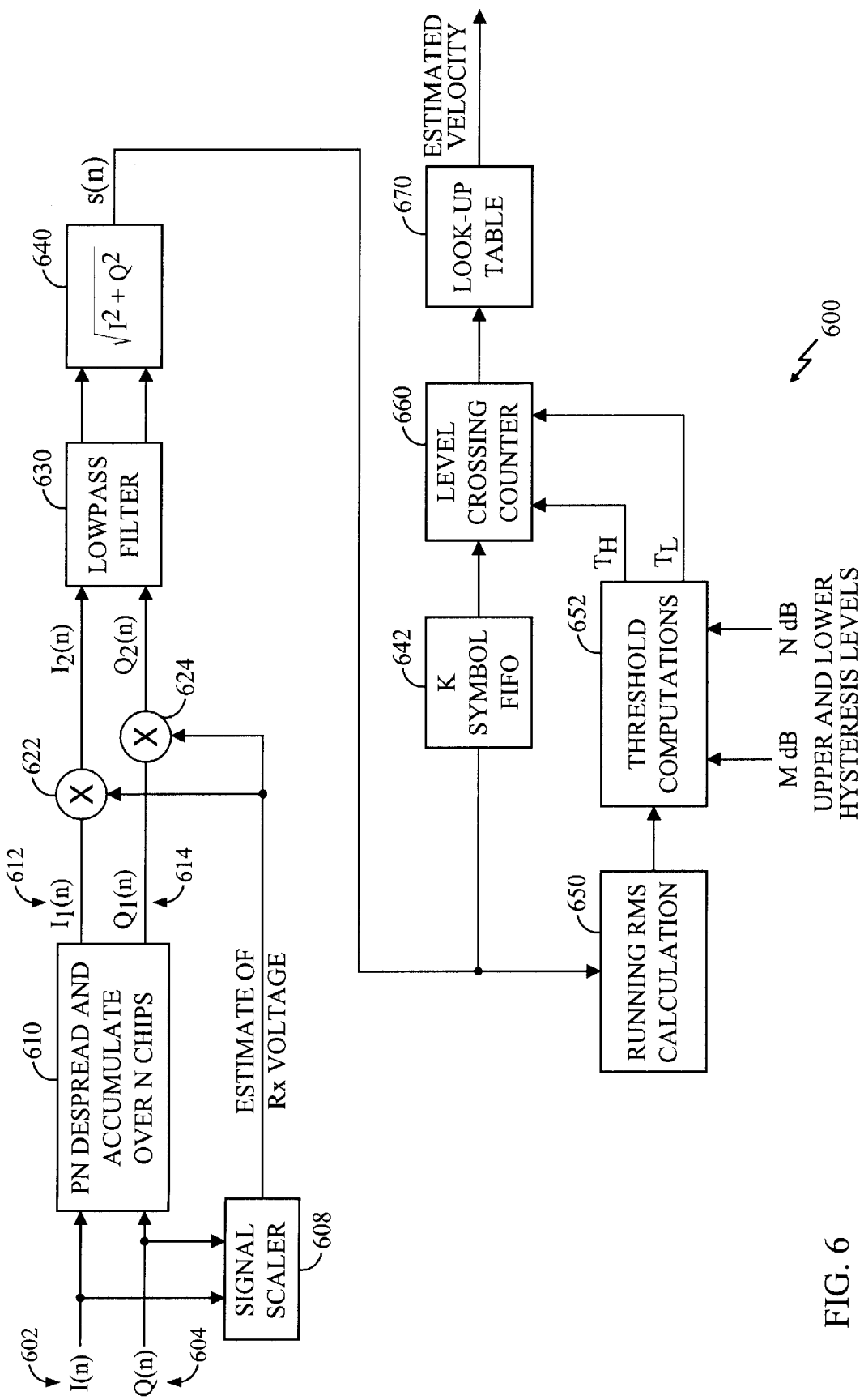
FIG. 6 is a block diagram of a velocity estimation implementation.

A first embodiment of a velocity estimator 600 is shown in FIG. 6. The velocity estimator 600 is shown for a receiver that utilizes quadrature signals, such as a CDMA wireless telephone. However, the use of quadrature signals is not required for operation of the velocity estimator 600.

In the first embodiment, the velocity estimator 600 is implemented within a CDMA wireless phone, such as one that operates within the communication systems defined in IS-95 or J-STD-008. Sampled in phase 602 and quadrature 604 signals are provided to a signal processor 610 that performs PN despreading and accumulation of a pilot signal over a predetermined period of N chips. The signal processor 610 operates as a multipath extractor. The signal processor 610 may be a microprocessor, digital signal processor, ASIC, or any combination of signal processor capable of performing the function. The signal processor 610 may be capable of performing the function as a stand alone unit or may perform the function in conjunction with memory and by using instructions saved in memory. Furthermore, the signal processor 610 may be dedicated to the described function or may perform additional functions. The outputs of the signal processor 610 are in phase pilot symbols 612 and quadrature pilot symbols 614. The in phase and quadrature pilot signals, 612 and 614, are coupled to corresponding multipliers, 622 and 624.

The same sampled in phase 602 and quadrature 604 signals that are provided to the signal processor 610 are also provided to a signal scaler 608. The signal scaler 608 may be integrated with the AGC circuit as shown in FIG. 4 or may be a circuit that performs an equivalent function. The output of the signal scaler 608 is a scaling factor that represents the inverse of the AGC gain. The scaling factor is coupled to each of the multipliers 622 and 624.

The output of the multipliers, 622 and 624, are signals that represent the in phase and quadrature pilot signals with the effects of the AGC circuit removed. The scaled signals are coupled to a low pass filter 630. The output of the low pass filter is coupled to a power calculation stage 640 that calculates the square root of the signal energy, denoted s(n), by taking the square root of the sum of the squares of the scaled in phase and quadrature pilot symbols.

The calculated value, s(n), is coupled to a running RMS calculator 650. The running RMS calculator 650 calculates a running RMS value using a predetermined number of consecutive values of s(n). The calculated running RMS value is coupled to a threshold computation stage 652. The threshold computation stage 652 uses the predetermined hysteresis values, M and N, to calculate the upper and lower level crossing thresholds. The calculated upper and lower threshold values are coupled to a level crossing counter 660.

The calculated values, s(n) are also coupled to a First In First Out (FIFO) buffer 642. The depth of the FIFO is determined to correspond with the number of symbols used in the running RMS calculation. The symbols output from the FIFO 642 are coupled to the level crossing counter 660. The level crossing counter 660 counts the number of level crossing using the calculated upper and lower thresholds to implement hysteresis in the counting.

The output of the level crossing counter 660 is coupled to a look up table 670 that maps the number of level crossings in a given period of time to an estimated velocity. The velocity estimate is output directly from the look up table 670. Alternatively, the look up table 670 is not implemented and the output of the level crossing counter 660 is used directly as a velocity estimate. The subsequent stage may be adapted to use the level crossing count directly or may calculate a velocity estimate from the level crossing count. When the subsequent stage is adapted to use the level crossing count directly, there is no need for the intermediate translation provided by the look up table 670. Where the subsequent stage uses the level crossing count directly, the level crossing count itself represents the velocity estimate.

Figure 7:
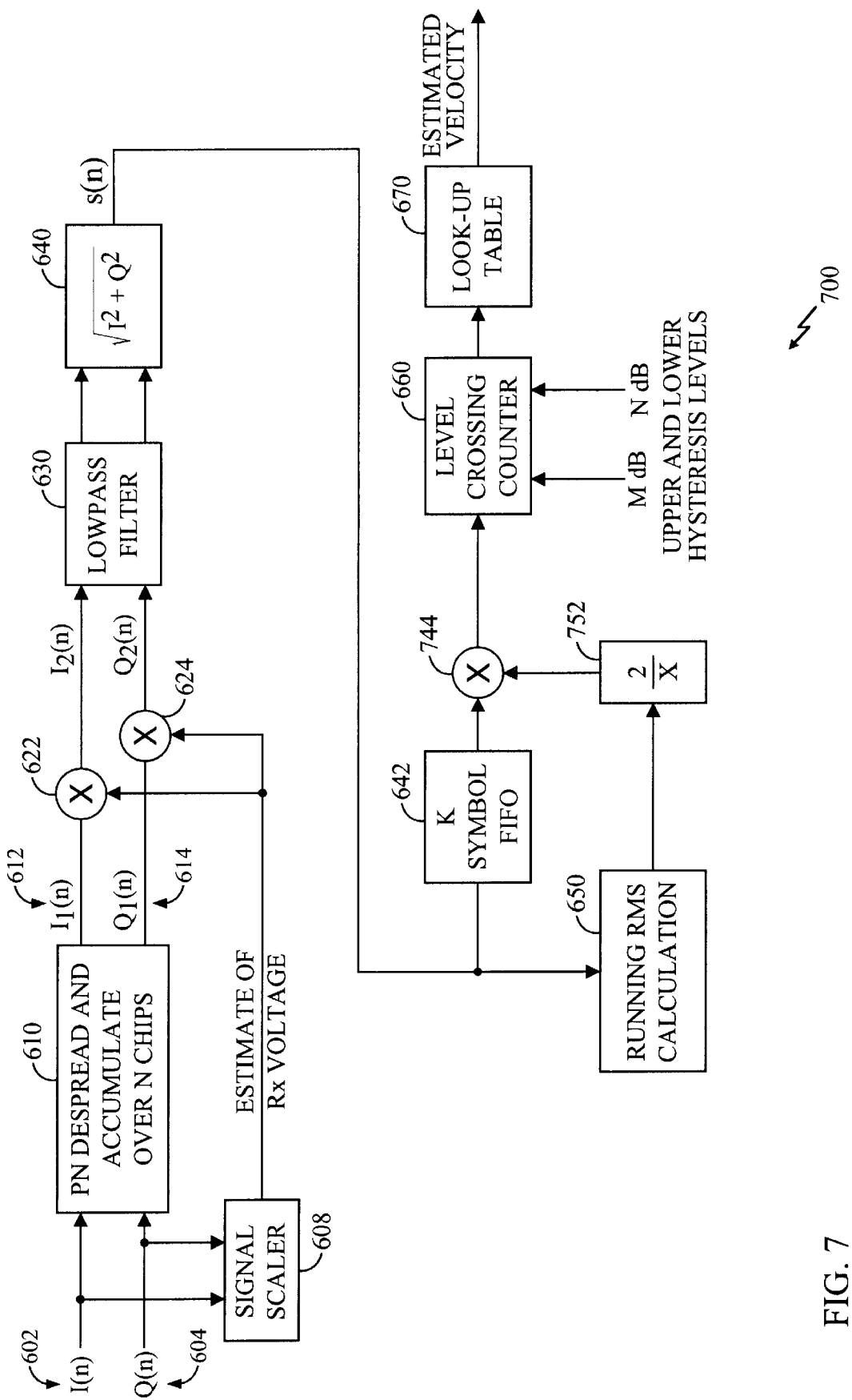
FIG. 7 is a block diagram of a velocity estimation implementation.

An alternative embodiment is shown in FIG. 7. The alternative velocity estimator 700 shown in FIG. 7 utilizes many of the same stages as are used in the velocity estimator 600 shown in FIG. 6. Those stages that remain the same are shown as having the same reference number. The differences in the two embodiments lie in the calculation of the level crossing. The stages up to the calculation of the square root of the signal energy, s(n), remain the same in the two embodiments. In the second embodiment, the signal s(n) is coupled to a running RMS calculation 650 and to a FIFO 642 as in the first embodiment. However, in the second embodiment, the output of the running RMS calculation 650 is coupled to a normalizing factor stage 752. The normalizing factor stage 752 calculates 2/x where x represents the output of the running RMS calculation stage 650. The value 2/x represents a normalizing factor. The output of the normalizing factor stage 752 is coupled to an input of a normalizing multiplier 744.

The output of the FIFO 642 is coupled to another input of the normalizing multiplier 744. The output of the normalizing multiplier 744 is the FIFO 642 output normalized by the one-half the running RMS value. The multiplier 744 output is coupled to a level crossing counter 660. The level crossing counter 660 is the same as used in the first embodiment. However, rather than using varying hysteresis thresholds, the level crossing counter 660 is able to use constant hysteresis thresholds. The level crossing counter 660 is able to use constant hysteresis thresholds because the input signal is normalized by a value proportional to the running RMS value. The output of the level crossing counter 660 is again coupled to a look up table 670 to determine the velocity estimate. Here again, the implementation of the look up table 670 is optional. The level crossing count may be used directly by a subsequent stage or a velocity estimate may be calculated from the level crossing count.

Figure 8:
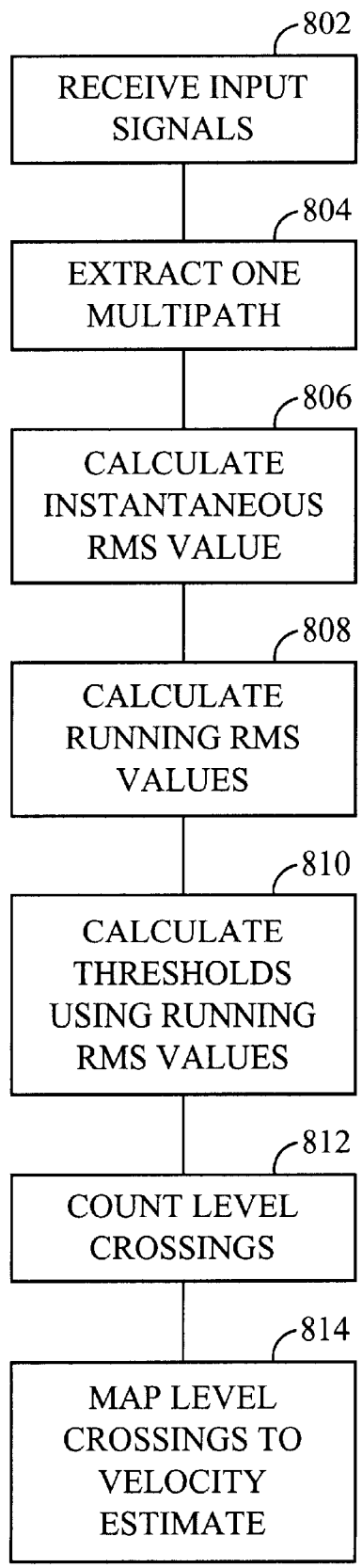
FIG. 8 is a flow chart of a velocity estimation method.

A flow chart of a first embodiment of a velocity estimation method is shown in FIG. 8. The routine starts by receiving input signals 802. In a CDMA phone these are the down-converted signal samples.

Next, one multipath is extracted from the received signals 804. This is performed in a CDMA phone by integrating one pilot over a specified period of time. This is performed in one finger of a multi-finger rake receiver. From the extracted multipath, the instantaneous envelope signal value is calculated 806. In a CDMA phone, the instantaneous value is found by summing the squares of the in phase and quadrature components of the integrated pilot signal. A running RMS value is calculated 808 from a predetermined number of instantaneous envelope values. Next, level crossing thresholds are calculated using the calculated running RMS value 810. An upper level crossing threshold is calculated by adding a predetermined upper hysteresis value to the calculated running RMS value. Similarly, a lower level crossing threshold is calculated by subtracting a predetermined lower hysteresis value from the calculated running RMS value.

Once the level crossing thresholds have been calculated, the number of level crossings is counted 812. A counting method incorporating hysteresis may be used to eliminate contributions due to noise. In one embodiment, the accumulated level crossing number is then mapped to a velocity estimate using a predetermined look up table 814. Alternatively, the accumulated level crossing number itself represents a velocity estimate. A look up table is not required where the accumulated level crossing number represents the velocity estimate.

Figure 9:
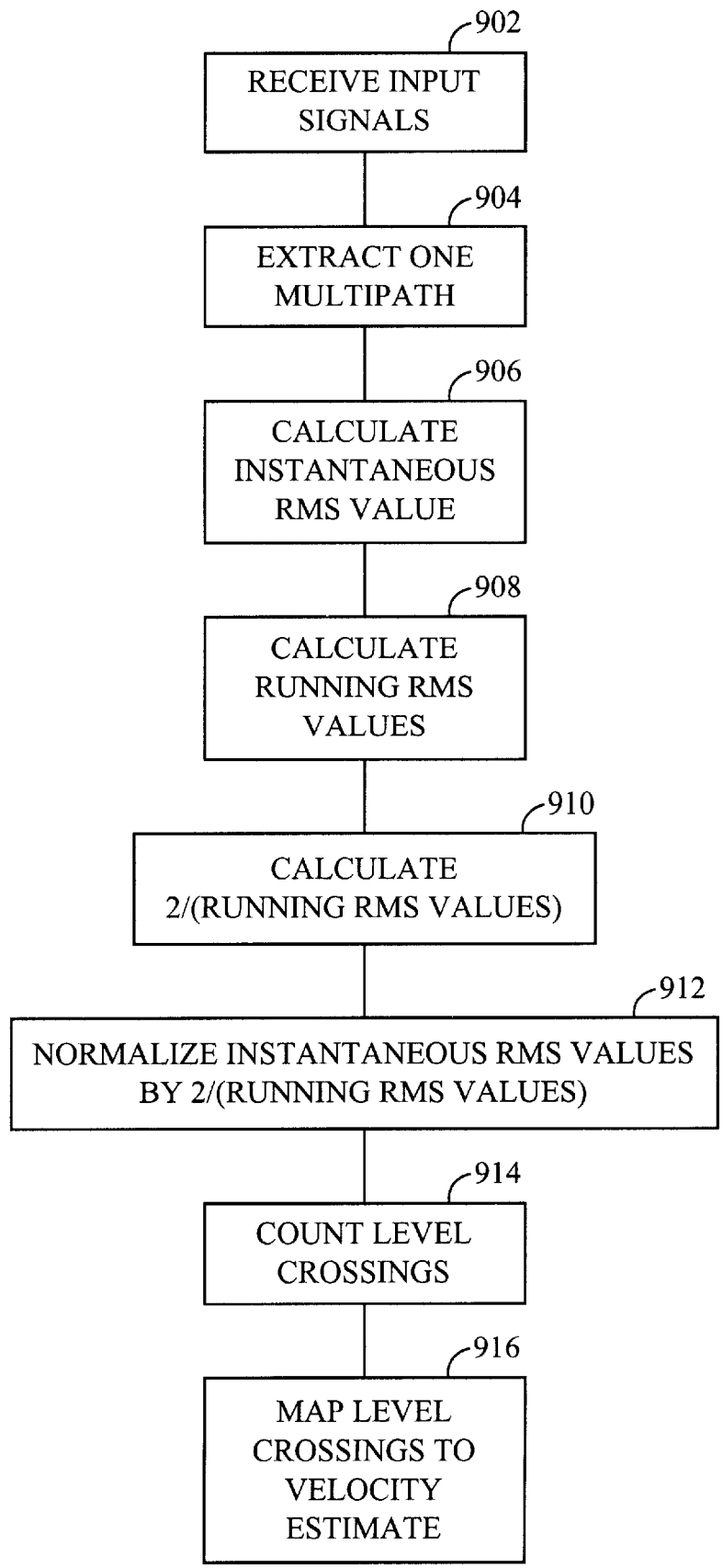
FIG. 9 is a flow chart of an alternative embodiment of a velocity estimation method.

An alternative velocity estimation embodiment is shown in FIG. 9. The routine starts by receiving input signals 902. The routine next proceeds to block 904 where one multipath is extracted from the received signal. The routine next calculates an instantaneous envelope value of the one multipath 906. The routine calculates a running RMS value using a plurality of the instantaneous envelope values 908. The routine next calculates a scaling factor that is equal to 2/(running RMS value) 910. The routine next scales each of the instantaneous envelope values with the scale factor 912. These normalized values are then used to count the number of level crossings 914. The number of level crossings is then mapped to a velocity estimate in a look up table 916. Here, the implementation of the look up table is optional as discussed in the previous embodiments. The number of level crossing may independently represent a velocity estimate.

Those of skill in the art would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Those skilled in the art recognize the interchangeability of hardware and software under these circumstances, and how best to implement the described functionality for each particular application.

The previous description of embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A velocity estimator comprising:
   a signal processor that extracts one multipath from a received signal;
   a signal scaler that generates a scale factor that is the inverse of an AGC gain;
   a multiplier that scales the extracted multipath by the scale factor;
   an instantaneous envelope calculator that calculates an instantaneous envelope value of the extracted multipath;
   a running RMS calculator that calculates a running RMS value using a plurality of instantaneous envelope values;
   a level crossing counter that calculates a number of level crossings, wherein the number of level crossings is the number of times the instantaneous envelope value crosses a level crossing threshold generated from the running RMS value.

2. The velocity estimator of claim 1 further comprising a look up table that maps the number of level crossings to a velocity estimate.

3. The velocity estimator of claim 1 wherein the received signal is a composite CDMA signal.

4. The velocity estimator of claim 3 wherein the signal processor extracts a multipath by despreading and accumulating a pilot signal from the composite CDMA signal over a predetermined number of chips.

5. The velocity estimator of claim 1 further comprising a FIFO that stores a predetermined number of instantaneous envelope values equal to the plurality of RMS values used to calculate the running RMS value.

6. The velocity estimator of claim 1 wherein the level crossing counter implements hysteresis in counting the level crossing by using an upper level crossing threshold and a lower level crossing threshold generated from the running RMS value 7. The velocity estimator of claim 6 wherein the upper level crossing threshold is calculated as a first predetermined number of dB, M, above the level crossing threshold.

8. The velocity estimator of claim 7 wherein the lower level crossing threshold is calculated as a second predetermined number of dB, N, below the level crossing threshold.

9. The velocity estimator of claim 8 wherein the level crossing threshold is one half the running RMS value.

10. The velocity estimator of claim 9 wherein M and N are 3.

11. A velocity estimator comprising:
    a signal processor that extracts one multipath from a received signal;
    a signal scaler that generates a scale factor that is the inverse of an AGC gain;
    a multiplier that scales the extracted multipath by the scale factor;
    an instantaneous envelope calculator that calculates an instantaneous envelope value of the extracted multipath;
    a running RMS calculator that calculates a running RMS value using a plurality of instantaneous envelope values;
    a normalizing multiplier that generates a normalized RMS value by multiplying the instantaneous envelope values by a normalizing factor generated from the running RMS value;
    a level crossing counter that calculates a number of level crossings, wherein the number of level crossings is the number of times the instantaneous envelope value crosses a predetermined level crossing threshold; and
    a look up table that maps the number of level crossings to a velocity estimate.

12. The velocity estimator of claim 11 wherein the normalizing factor is 2/(running RMS value).

13. A method of velocity estimation comprising:
    receiving composite input signals;
    extracting single multipath signals from the composite input signals;
    calculating instantaneous envelope values of the extracted multipath signals;
    calculating a running RMS value of the extracted multipath signals;
    counting the number of crossings of a level crossing threshold made by the instantaneous envelope values.

14. The method of claim 13 further comprising mapping the number of crossings to a velocity estimate.

15. The method of claim 13 wherein the composite input signals are CDMA signals.

16. The method of claim 13 wherein extracting the single multipath signals is performed by PN despreading and accumulating a pilot signal over a predetermined number of chips.

17. The method of claim 13 wherein the instantaneous envelope value is calculated by taking the square root of the sum of the squares of an in phase signal component and a quadrature signal component.

18. The method of claim 13 wherein the number of crossings is calculated using a high level crossing threshold and a low level crossing threshold, wherein the high level crossing threshold is a first predetermined number, M, dB greater than one half the running RMS value and the low level crossing threshold is a second predetermined number, N, dB below one half the running RMS value and wherein a level crossing occurs when the instantaneous envelope values indicate the instantaneous envelope values over time cross both the high level crossing threshold and the low level crossing threshold.

* * * * *